W. V. TURNER.
ELECTROFLUID PRESSURE BRAKE.
APPLICATION FILED OCT. 21, 1916.
1,245,288.
Patented Nov. 6, 1917.
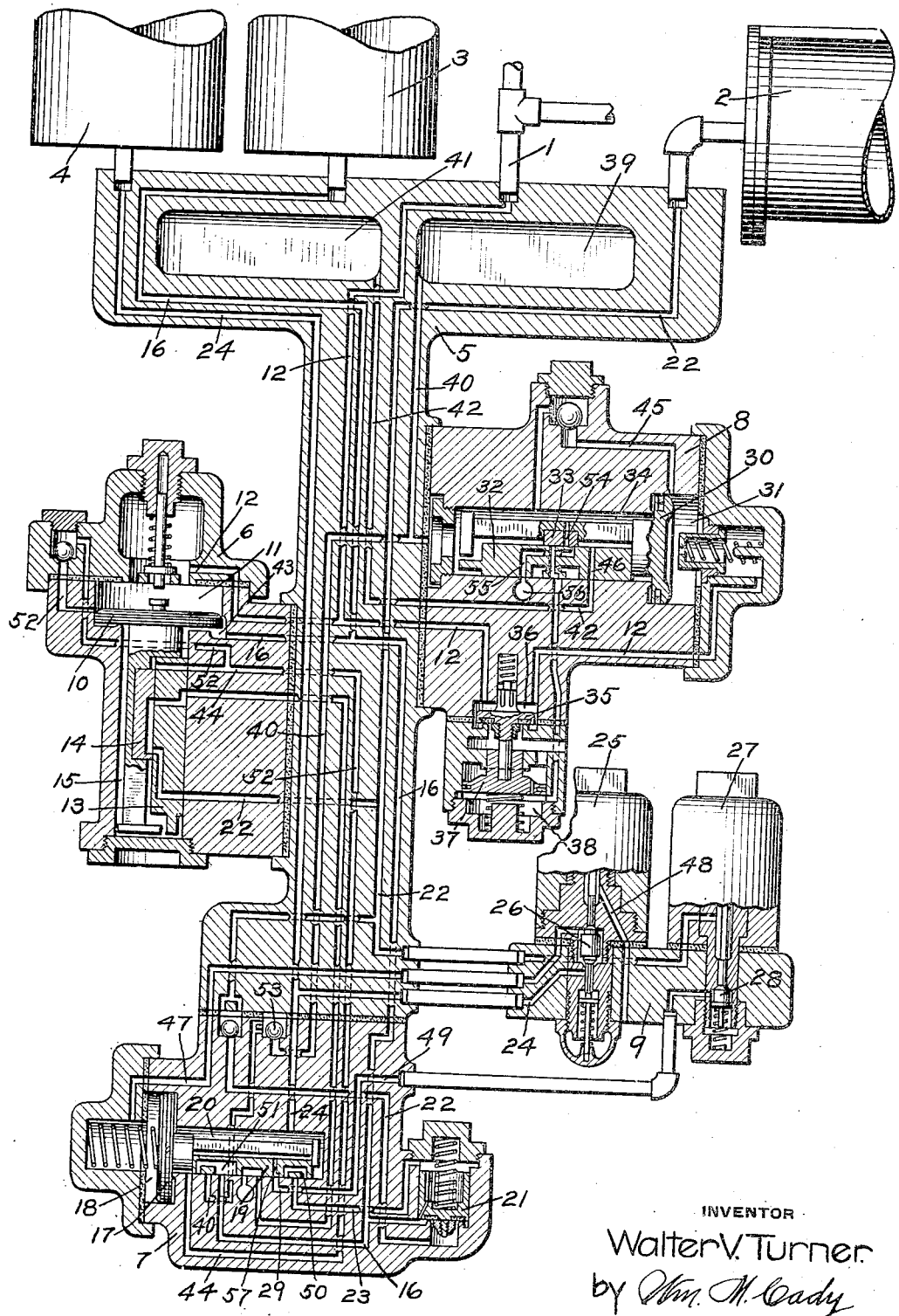
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA.

ELECTROFLUID-PRESSURE BRAKE.

1,245,288.  Specification of Letters Patent.  Patented Nov. 6, 1917.

Application filed October 21, 1916. Serial No. 126,871.

*To all whom it may concern:*

Be it known that I, WALTER V. TURNER, a citizen of the United States, residing at Wilkinsburg, in the county of Allegheny and State of Pennsylvania, have invented new and useful Improvements in Electrofluid-Pressure Brakes, of which the following is a specification.

This invention relates to electro-pneumatic brakes, and more particularly to a brake controlling valve device having an emergency quick action portion.

It has heretofore been proposed to employ an emergency valve device subject to the opposing pressures of the brake pipe and a quick action chamber and in which a service position is provided for venting fluid from the quick action chamber in order to reduce the quick action chamber pressure at the same rate as the brake pipe pressure is reducing so as to prevent movement of the emergency valve device to emergency position when a service application of the brakes is effected, as covered by my pending application Serial No. 855,676, filed August 7, 1914.

In order to prevent wear of the emergency piston and slide valve by movement in service applications of the brakes, one object of my invention is to provide means for reducing the quick action chamber pressure with the brake pipe pressure in service applications without moving the emergency valve parts.

Other objects and advantages will appear in the following more detailed description of the invention.

In the accompanying drawing, the single figure is a diagrammatic sectional view of an electro-pneumatic brake equipment embodying my improvement.

According to the construction shown, the equipment may comprise a brake pipe 1, brake cylinder 2, auxiliary reservoir 3, supplemental reservoir 4, and a brake controlling valve device having a pipe bracket 5 to which are connected an equalizing valve portion 6, a cut-off valve portion 7, an emergency valve portion 8, and an electro-pneumatic portion 9.

The equalizing portion 6 comprises a piston 10 contained in piston chamber 11 connected by passage 12 to brake pipe 1 and slide valves 13 and 14 contained in valve chamber 15 and adapted to be operated by piston 10, the valve chamber 15 being connected by passage 16 with auxiliary reservoir 3.

The cut-off valve portion comprises a piston 17 contained in piston chamber 18, a slide valve 19 contained in valve chamber 20 and adapted to be operated by piston 17, and a valve piston 21 having one side connected by passage 22 with brake cylinder 2 and the opposite side to a passage 23 leading to the seat of slide valve 19, the valve chamber 20 being connected by passage 24 with supplemental reservoir 4.

The electro-pneumatic portion comprises a release magnet 25 adapted to operate a double beat valve 26 and a service application magnet 27 adapted to operate a valve 28 for supplying fluid from passage 29 leading to the seat of slide valve 19 to brake cylinder passage 22.

The emergency valve portion comprises a piston 30 contained in piston chamber 31 connected to brake pipe passage 12, a main slide valve 32 and an auxiliary slide valve 33 contained in valve chamber 34 and adapted to be operated by piston 30, a quick action valve 35 contained in valve chamber 36 open to brake pipe passage 12, and a piston 37 contained in piston chamber 38 and adapted to operate the valve 35. A quick action chamber 39 is connected by passage 40 with valve chamber 34 and a quick action closing chamber 41 is connected to a passage 42 leading to the seat of slide valve 32.

In operation, fluid supplied to brake pipe 1 flows through passage 12 to equalizing piston chamber 11 and thence through the usual feed groove 43 to valve chamber 15, the auxiliary reservoir 3 being charged from said valve chamber through passage 16.

The supplemental reservoir 4 is charged from the brake pipe through passage 44 leading to valve chamber 20 of the cut-off valve device and thence through passage 24.

Brake pipe pressure also flows through passage 12 to emergency piston chamber 31 and thence through passage 45 to valve chamber 34, charging the quick action chamber 39 through passage 40 and the quick action closing chamber through port 46 and passage 42.

If it is desired to effect an electric service application of the brakes both the release magnet 25 and the service magnet 27 are energized. The energization of release magnet 25 operates the double beat valve 26 so as to vent fluid from piston chamber 18 through passage 47 to exhaust passage 48, so that piston 17 shifts the slide valve 19 to connect a passage 49 through cavity 50 with a passage 23.

Fluid is then vented from the spring side of valve piston 21 by the opening of service valve 28, which connects passage 49 with brake cylinder passage 22. The consequent opening of valve piston 21 permits fluid to flow from auxiliary reservoir passage 16 to brake cylinder passage 22, so that an application of the brakes is effected.

The operation as so far described corresponds with that of the construction covered by a prior patent application of mine Serial No. 124,010, filed October 6, 1916.

According to my present improvement, the quick action chamber passage 40 is connected by cavity 51 with auxiliary reservoir passage 16 when the cut-off valve 19 moves to service application position, so that the pressure in the quick action chamber 39 as well as the quick action closing chamber 41 reduces with the auxiliary reservoir pressure by flow to the brake cylinder, and since the brake pipe pressure is maintained at the same pressure as the auxiliary reservoir, by reason of the connection of passage 52, leading to piston chamber 11, with passage 44, and the connection of passage 44 through cavity 51 with passage 16, the quick action chamber pressure will reduce in an electric service application of the brakes at the same rate as the brake pipe reduces, so that there will be no movement of the emergency piston 30. In addition, there is a saving of fluid, since the fluid in the quick action chamber and the quick action closing chamber is vented with auxiliary reservoir pressure to the brake cylinder instead of to the atmosphere.

If the brake pipe pressure should be further reduced after the auxiliary reservoir pressure has equalized into the brake cylinder, the emergency piston 30 will be shifted to service position by the quick action chamber pressure, in which position fluid is vented from the quick action chamber through ports 54 and 55 to exhaust port 56. If the auxiliary reservoir pressure were permitted to flow back to the quick action chamber, then the reduction in quick action chamber pressure by flow at the exhaust port 56 might not be as rapid as the reduction in brake pipe pressure, and as a consequence, the emergency piston 30 might be shifted to emergency position and thus cause an undesired emergency application of the brakes.

In order to prevent the above action, a check valve 53 is inserted in passage 40 so as to prevent flow from the auxiliary reservoir to the quick action chamber.

If it should happen that the cut-off valve 19 be shifted to service position without energizing the service magnet, the connection of the exhaust passage 49 to the spring side of the valve piston 21 might in itself be sufficient to open the valve piston and thus permit the admission of fluid to the brake cylinder when not desired. In order to prevent this, a restricted port 57 is provided in the cut-off valve 19 for maintaining fluid pressure in passage 49 when the cut-off valve is in normal position.

Having now described my invention, what I claim as new, and desire to secure by Letters Patent, is:—

1. In a fluid pressure brake, the combination with a brake cylinder, brake pipe, and means for effecting a service application of the brakes, of an emergency valve device subject to the opposing pressures of the brake pipe and a chamber and means operating upon a service application of the brakes for venting fluid from the chamber to the brake cylinder.

2. In a fluid pressure brake, the combination with a brake cylinder, brake pipe, auxiliary reservoir, and means for supplying fluid from the auxiliary reservoir to the brake cylinder for effecting a service application of the brakes, of an emergency valve device subject to the opposing pressures of the brake pipe and a normally charged chamber and means operated upon a service application of the brakes for venting fluid from said chamber with fluid from the auxiliary reservoir to the brake cylinder.

3. In a fluid pressure brake, the combination with a brake cylinder, brake pipe, auxiliary reservoir, and means for supplying fluid from the auxiliary reservoir to the brake cylinder for effecting a service application of the brakes, of an emergency valve device comprising a valve for effecting an emergency application of the brakes and a piston subject to the opposing pressures of the brake pipe and a normally charged chamber for operating said valve, and means operated upon a service application of the brakes for venting fluid from said chamber to the brake cylinder.

4. In an electro-pneumatic brake, the combination with a brake pipe and an emergency valve device subject to the opposing pressures of the brake pipe and a chamber, of electrically controlled means for effecting a service application of the brakes and the venting of fluid from said chamber.

5. In an electro-pneumatic brake, the combination with a brake pipe, brake cylinder, auxiliary reservoir, and an emergency valve device subject to the opposing pressures of the brake pipe and a normally charged chamber, of electrically controlled means for supplying fluid from the auxiliary reservoir and from said chamber to the brake cylinder in effecting a service application of the brakes.

6. In an electro-pneumatic brake, the combination with a brake pipe, brake cylinder, auxiliary reservoir, and an emergency valve device subject to the opposing pressures of the brake pipe and a normally charged chamber, of a valve device for connecting the auxiliary reservoir and said chamber with the brake cylinder and electrically controlled means for operating said valve device to effect a service application of the brakes.

7. In a fluid pressure brake, the combination with a brake pipe, auxiliary reservoir, and brake cylinder, of an emergency valve device subject to the opposing pressures of the brake pipe and a chamber, means for supplying fluid from the auxiliary reservoir and said chamber to the brake cylinder in a service application of the brakes and a check valve for preventing back flow from the auxiliary reservoir to said chamber.

8. In an electro-pneumatic brake, the combination with valve means for controlling the supply of fluid to effect an application of the brakes, of electrically controlled means having a passage through which fluid is vented from said valve means for operating same and a valve device controlling said passage and normally adapted to supply fluid thereto.

In testimony whereof I have hereunto set my hand.

WALTER V. TURNER.

Copies of this patent may be obtained for five cents each, by addressing the "Commissioner of Patents, Washington, D. C."